US010454691B2

(12) United States Patent
Cambou (10) Patent No.: US 10,454,691 B2
(45) Date of Patent: Oct. 22, 2019

(54) SYSTEMS IMPLEMENTING HIERARCHICAL LEVELS OF SECURITY

(71) Applicant: Arizona Board of Regents on Behalf of Northern Arizona University, Flagstaff, AZ (US)

(72) Inventor: Bertrand Francis Cambou, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 210 days.

(21) Appl. No.: 15/604,376

(22) Filed: May 24, 2017

(65) Prior Publication Data
US 2017/0346644 A1 Nov. 30, 2017

Related U.S. Application Data

(60) Provisional application No. 62/341,013, filed on May 24, 2016.

(51) Int. Cl.
*H04L 9/32* (2006.01)
*H04L 29/06* (2006.01)
*H04L 9/08* (2006.01)

(52) U.S. Cl.
CPC .......... *H04L 9/3278* (2013.01); *H04L 9/0861* (2013.01); *H04L 63/08* (2013.01); *H04L 63/105* (2013.01)

(58) Field of Classification Search
CPC ..... H04L 9/32; H04L 9/08; H04L 9/30; H04L 9/0866; H04L 9/3271; H04L 9/3278;
(Continued)

(56) References Cited

U.S. PATENT DOCUMENTS 8,516,269 B1 * 8/2013 Hamlet ................. G06F 21/445
340/5.8
8,667,265 B1 * 3/2014 Hamlet ................. H04L 9/0866
326/80
(Continued)

OTHER PUBLICATIONS

Charalambos Konstantinou, Michail Maniatakos, Fareena Saqib, Shiyan Hu, "cyber-physical systems: A security perspective", 2015, IEEE (Year: 2015).*
(Continued)

*Primary Examiner* — Saleh Najjar
*Assistant Examiner* — Khalid M Almaghayreh
(74) *Attorney, Agent, or Firm* — Quarles & Brady LLP (57) ABSTRACT

Systems and methods for providing variable access authentication respond to the need of a hierarchical level of security, which may include the use of multiple physically unclonable functions (PUFs) and/or the distribution of a set of authentication keys with "don't care" states. Each of the multiple PUFs can drive a separate level of access control, while "don't care" states can be included in the authentication keys when the security risk levels are lower. These two methods can be implemented independently, or in a combination for higher levels of security. At one end of the embodiment the IT manager can have backdoor capabilities if a user forgot a password, on the other end access control to an Internet device needs to be extremely stringent when the user operates in unsafe territory.

17 Claims, 9 Drawing Sheets

(58) Field of Classification Search
CPC ... H04L 9/0838; H04L 63/08; H04L 63/0861; H04L 63/10; H04L 63/105; G06F 21/30; G06F 21/70; G06F 21/44; G06F 21/606; G06F 2221/2113
USPC .......... 713/166, 168, 171, 182; 726/2, 4, 14, 726/17, 21; 705/2, 5
See application file for complete search history.

(56) References Cited

U.S. PATENT DOCUMENTS

| | | | | |
|---|---|---|---|---|
| 8,868,923 | B1* | 10/2014 | Hamlet | G06F 21/00 326/8 |
| 8,918,647 | B1* | 12/2014 | Wallrabenstein | H04L 63/0853 713/172 |
| 9,208,355 | B1* | 12/2015 | Areno | G06F 21/73 |
| 9,501,664 | B1* | 11/2016 | Hamlet | G06F 21/71 |
| 9,946,858 | B2* | 4/2018 | Wallrabenstein | G06F 21/31 |
| 9,998,445 | B2* | 6/2018 | Wallrabenstein | H04L 63/0853 |
| 2006/0242064 | A1* | 10/2006 | Jogand-Coulomb | G06F 21/10 705/50 |
| 2008/0010449 | A1* | 1/2008 | Holtzman | G06F 21/445 713/157 |
| 2013/0212642 | A1* | 8/2013 | Walsh | G06F 21/44 726/2 |
| 2014/0279532 | A1* | 9/2014 | Tremlet | G06F 21/73 705/44 |
| 2015/0134966 | A1* | 5/2015 | Wallrabenstein | H04L 63/0853 713/174 |
| 2015/0195088 | A1* | 7/2015 | Rostami | G09C 1/00 380/28 |
| 2015/0317480 | A1* | 11/2015 | Gardner | H04L 9/3221 726/2 |
| 2015/0317481 | A1* | 11/2015 | Gardner | H04L 9/3278 726/2 |
| 2016/0301534 | A1* | 10/2016 | Chen | H04L 9/3278 |
| 2016/0328571 | A1* | 11/2016 | Duplys | H04L 63/10 |
| 2018/0006813 | A1* | 1/2018 | Van Der Leest | G09C 1/00 |

OTHER PUBLICATIONS

S. T. Choden Konigsmark, Leslie K. Hwang, Deming Chen, Martin D. F. Wong, "System-of-PUFs: Multilevel Security for Embedded Systems", 2014, ACM (Year: 2014).*

(S. T. Choden Konigsmark, Leslie K. Hwang, Deming Chen, Martin D. F. Wong, "System-of-PUFs: Multilevel Security for Embedded Systems" ACM, Oct. 2014) (Year: 2014).*

* cited by examiner

| MEMORY | Example of PUF Generation | Quality |
|---|---|---|
| SRAM | Random Flip of the 6T cell: start as a "0" or a "1" after power up | Mainstream but not really secure |
| DRAM | Discharge the capacitors, then measure: Get a "0" or a "1" | Need constant refresh |
| ReRAM | Variations of the value of the Vset: Define a "0" or a "1" | Quite novel |
| MRAM | Variations of the Rmax's after programming: Define a "0" or a "1" | Quite novel |
| Flash | Partial programming, then measure: Get a "0" or a "1" | Slow programming |

FIG. 9

SYSTEMS IMPLEMENTING HIERARCHICAL LEVELS OF SECURITY

CROSS-REFERENCE TO RELATED APPLICATIONS

This application is a nonprovisional claiming the benefit of U.S. Prov. Pat. App. Ser. No. 62/341,013, filed under the same title on May 24, 2016, and incorporated fully herein by reference.

FIELD OF THE INVENTION

The present invention relates to a hierarchical architecture of security for cyber physical systems.

BACKGROUND OF THE INVENTION

Emerging technologies that integrate computational algorithms and physical components in a hybridized engineered system are referred to as cyber-physical systems (CPSs). In a CPS, there may be a network of hardware and software "cyber" components that monitor, modify, or enact behavior within a physical process or component. Suggested applications of CPSs have included autonomous vehicles, "smart" infrastructure, medical monitoring, or advanced manufacturing, among others. In a typical system, a network of components may include sensing, actuating, computing, and communication capabilities that are seamlessly integrated in a physical system. The tight integration of cyber with physical components, however, increases the security vulnerabilities of the physical components, for example, an autonomous car being susceptible to remote control through an attack by a computer hacker. It is therefore important for a system and method of authentication of users in a CPS-enabled environment.

There are a number of methods currently employed for authenticating users of a computer system, but they have a number of disadvantages. The complexity of CPSs and their components have introduced new difficulties to security and privacy protection that are not encountered in more traditional computing devices. Furthermore, the nature of CPS functionality and use across a variety of environments and applications may increase potential motivators or sources of security threats. It may be important to employ hierarchical security architectures for certain applications. Hierarchical architectures are important to offer the flexibility to increase or decrease the level of security of CPSs depending on a threat level. Within a highly secure environment it may be desirable to simplify the access control, whereas in the case of an unknown or unsafe environment, additional protections may be needed. Current hierarchical architectures that can implement low-security backdoor capability are complicated to implement and could create easy entry points to a hacker. It would be beneficial to have a security architecture that more efficiently and reliably provides variable levels of security for accessing a cyber physical system.

SUMMARY OF THE INVENTION

Systems and methods are described in the present disclosure for securing a cyber physical system (CPS) using hierarchical levels of security. In one aspect, the present disclosure provides an authentication system for controlling access to a cyber-physical system. The authentication system includes secure memory, a physically unclonable function (PUF) system, a processor, and a communication network. The secure memory stores a reference key and a challenge-response pair (CRP) generated from a hardware device authorized to access the cyber-physical system. The secure memory is configured to receive a request for the reference key, compare information in the request to the CRP, and send the reference key when the information matches the CRP. The PUF system generates responses to PUF challenges. The processor communicates with the secure memory, the PUF system, and a communication network.

The processor executes program instructions that, upon execution, cause the processor to: receive, from the hardware device over the communication network, a request for access to the cyber physical system, the request comprising a PUF challenge and an authentication key; determine, based on the PUF challenge, whether the hardware device corresponds to a first security level or a second security level; send the PUF challenge to the PUF system; receive, from the PUF system, a PUF response; associate the PUF challenge with the PUF response to produce a first CRP; send the first CRP to the secure memory; receive the reference key from the secure memory; compare the authentication key to the reference key to determine that the hardware device is authorized to access the cyber-physical system; and, allow the hardware device to access the cyber-physical system. Responsive to a determination that the hardware device corresponds to the first security level, the processor compares all of the authentication key to the reference key; responsive to a determination that the hardware device corresponds to the second security level, the processor compares only a first portion of the authentication key to the reference key.

In one embodiment of the authentication system, the PUF challenge and the authentication key are encrypted. In another embodiment, the PUF system is implemented in one of a memory array, a ring oscillator, and a gate delay structure. The authentication key may consist of a generic key, a complementary key, and an additional key. Execution of the program instructions may further cause the processor to determine whether the hardware device corresponds to a third security level. Responsive to a determination that the hardware device corresponds to the third security level, the processor compares only the generic key of the authentication key to the reference key for authentication. In one embodiment of the authentication system, the first level of security is associated with a low security environment, the second level of security is associated with a high security environment, and the third level of security is associated with a trusted environment.

In another aspect, the present disclosure provides a method for authenticating a requesting device. The method includes: receiving a physically unclonable function (PUF) challenge and an authentication key; determining, from a hierarchical plurality of levels of access control, and based at least in part on the PUF challenge, that the requesting device corresponds to a first security level; matching the PUF challenge to a PUF response to produce a challenge-response pair (CRP) that is associated with the requesting device; and, comparing, based on the first security level, the authentication key to the reference key associated with the CRP to authenticate the requesting device. In one embodiment, comparing the authentication key to the reference key includes the steps of determining that the first security level is for non-secure hardware devices, and determining that the authentication key is identical to the reference key. If the first security level is for secure hardware devices, authentication includes the steps of determining that the authentication key and the reference key are the same length, identifying a first portion and a second portion of the authentication key, and determining that the first portion of the authentication key matches a corresponding portion of the reference key; this is done without comparing the second portion of the authentication key to the reference key.

Authentication may include generating a plurality of PUFs, each from a different portion of a memory array, and associating each level of the plurality of levels of access control with a corresponding PUF. Matching the PUF challenge to the PUF response may include processing the PUF challenge using the PUF associated with the first level of security to produce the PUF response. Each level of the plurality of levels of access control may include information identifying one or more portions of a received authentication key to be compared to the reference key for determining authentication; the information for a level of highest access control may indicate that all of the received authentication key is to be compared. In one embodiment, comparing the authentication key to the reference key includes the steps of identifying a first set of bits and a second set of bits, setting each of the second set of bits to a "don't care" state that matches all values of a bit in the reference key, and determining that each bit of the authentication key matches each corresponding bit of the reference key.

In yet another aspect, the present disclosure provides a system including a processor and memory storing program instructions. The processor executes the program instructions, which upon execution cause the processor to: receive, from a requesting device, a request for access a secure computing system, the request including a physically unclonable function (PUF) challenge and an authentication key. The authentication system may determine, from a hierarchical plurality of levels of access control, and based at least in part on the PUF challenge, that the requesting device corresponds to a first security level. By matching the PUF challenge to a PUF response to produce a challenge-response pair (CRP) associated with the requesting device, the system receives a reference key associated with the CRP and compares, based on security level, the authentication key to the reference key to authenticate the requesting device to the secure computing system.

The plurality of levels of access control may include information for determining authentication based on a received authentication key. In this aspect, to authenticate a hardware device to use the secure computing system, the hardware device presenting the received authentication key to the processor and corresponding to one of the first security level, a second security level of the plurality of levels, and a third security level of the plurality of levels, execution of the program instructions causes the processor to: based on the information, identify in the received authentication key a first string of bits, a second string of bits, and a third string of bits that together comprise an entirety of the received authentication key; and, identify, in the information, comparison instructions. The comparison instructions may indicate to the processor that, to authenticate the hardware device: the entirety of the received authentication key must match a first reference key corresponding to the first security level; only the first string of bits and the second string of bits must match corresponding first and second portions of a second reference key corresponding to the second security level, and the third string of bits is treated as matching a corresponding third portion of the second reference key; and, only the first string of bits must match a corresponding first portion of a third reference key corresponding to the third security level, and the second string of bits and the third string of bits are treated as matching corresponding second and third portions of the third reference key.

Each level of the plurality of levels of access control may be associated with a plurality of PUFs and with the same reference key. Each of the plurality of levels of access control includes information identifying one or more portions of a received authentication key to be compared to the reference key for determining authentication, wherein unidentified portions are replaced with "don't care" states that match the reference key. Each level of the plurality of levels of access control may be assigned a different reference key. The system may further include a PUF system in communication with the processor and configured to receive the PUF challenge, processes the PUF challenge to produce the PUF response and identify a CRP. The system may further include a secure memory that stores the reference key associated with the CRP.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure.

DETAILED DESCRIPTION

There is a growing trend of "smart" devices, such as phones and tablets, that may use a variety of protocols such as BLUETOOTH, WIFI, 3G, etc. to connect to other devices to share information such as through the internet or a local network. Smart devices may take a number of form factors and may support multiple tasks or functions, such as a phone, camera, and GPS receiver. Cyber physical systems (CPSs) represent a general class of technologies that merge computational abilities with physical objects, enabling interconnectivity among smart devices to collect and exchange data. In a CPS, the attributes of a smart device are taken a step further, wherein the interconnectivity and shared information between devices or components of the system are used for non-virtual interaction. A CPS may include a collection of networked components with embedded sensors, processors, or actuators that sense and interact with the physical world, including human users or other CPSs. A CPS may exhibit autonomous behavior based on internal computations, algorithms, or control processes in response to physical stimuli received through sensors, communication networks, or other inputs. The joint coordinated action of the "cyber" and "physical" elements of a system is a critical attribute.

CPSs have been proposed as technology solutions for a variety of sectors, including agriculture, energy, transportation, building design, healthcare, and manufacturing. For example, CPS-enabled medical devices could be on the horizon for providing continual sensing and monitoring of a bodily function, communicating the readings to a doctor for review, and enabling a second device to administer some sort of physical response such as the delivery of medicine. These systems have been proposed for treating diabetes through an automated system that senses blood sugar and delivers insulin as needed, or heart pacemakers that can dynamically adjust electroshock parameters based on real-time monitoring of signals such as hormone levels, blood pressure, and other measurable factors. Each of these applications is predicated on physical devices sensing at least one parameter, communicating said parameter to at least one computational element of the system that may perform some algorithm to determine a proper response, and enacting at least one physical element of the system. In these examples, the CPS is confined to a relatively localized network, though communication with other devices, such as a cell phone or doctor's computer for monitoring may require broader network communication through the internet.

In other applications, CPSs may be integrated into much larger and more public areas, such as physical infrastructure. CPS technologies could potentially be implemented in roadways or other transportation systems to monitor activity and improve efficiency or safety measures. Another implementation may be in building management systems for efficient use of energy within a single building but also integration with external infrastructure such as the power grid, utility providers, or safety and law enforcements agencies. These applications would require larger-scale network connectivity.

As the interaction between the cyber and physical systems increases, the physical systems become more susceptible to security vulnerabilities in the cyber system, such as through malicious network attacks or other vulnerabilities. Common security threats are eavesdropping, where network communications are surreptitiously monitored; and spoofing, where an attacker may be disguised as an authorized user in order to gain fraudulent access. Rather than just theft or disruption of personal or commercial data, cyber attackers could take control of the physical output of a system. The communication and computational technologies that enable the existence of CPSs create entry points for hackers, wherein cyber attackers could manipulate implanted medical devices or interfere with the power grid. As CPS technology is implemented in more sectors, there are a larger number of motivating factors and potential targets of attack. Services could be disrupted or attacked for financial or political gain, personal or business privacy could be exploited, or other criminal or terror-related reasons for an attack on a CPS. Cybersecurity measures that protect CPSs are therefore of utmost importance.

Computer networks are faced with the task of communicating in a secure way with trustworthy distributed elements. The essence of access control is to match a password, secret key, biometric print, or any other reference pattern associated with a particular user or distributed element against the same reference pattern that is stored in the secure host or the distributed element. In hierarchical security architectures, the security protocols for granting access control may be made more or less stringent depending on the threat level.

The present disclosure describes and enables systems and methods for providing variable levels of multi-factor authentication security for access control of a cyber physical system (CPS) or other computer systems using hardware-based identifiers in conjunction with cryptographic access keys. The novel apparatus and set of methods disclosed herein are intended to make full use of physical hardware architecture to deliver cyber security mechanism that are rather simple to implement with commercially available microelectronic componentry. The systems implement a hierarchical level of security through the use of physically unclonable functions (PUFs) that are used in conjunction with cryptographic authentication keys. PUFs may be used to determine the identity and security risk of a network-connected distributed device or component. The level of risk associated with a distributed device determines the security strength of the cryptographic authentication key that must be provided to gain access control to the system. Authentication keys may include ternary data states, wherein bits may take values of "1", "0", or "don't care" states. More bits of binary data states may be implemented for access control at higher security risk levels, while more bits with "don't care" states may be included when the security risk levels are lower. For example, at one end of a CPS security spectrum, an IT manager on a secure internal server may face lower levels of access control, whereas when an external user operates in unsafe territory, such as an internet connected device, access control may be extremely stringent.

Physically Unclonable Functions (PUFs) are part of a set of cryptographic primitives that can generate the equivalent uniqueness of human DNA or finger prints to strengthen the level of security of authentication protocols. PUFs exploit intrinsic manufacturing variations such as critical dimensions, local variations in doping levels of semiconducting layers, and threshold voltages that are introduced during the fabrication of the devices. These variations make each device unique and identifiable from each other. The underlying mechanism of PUF is the creation of a large number of Challenge (i.e. Input) Response (i.e. output) Pairs (CRPs) that are unique to each device. A challenge applied to a device will produce an unpredictable but repeatable response due to the physical microstructure of the device. In general, a challenge may for example be a binary input to the system that is a string a certain number of bits in length, and the response from a PUF may be a second string of bits. For a given device, a string of bits comprising the challenge will elicit the same string of bits as a response each time; together the challenge and response form a CRP. This inherent uniqueness of CRPs relative to a specific piece of hardware are used to verify identity. Once deployed, a PUF system is queried with a challenges from a device and the responses are used to identify and authenticate the device using known CRPs.

Figure 1:
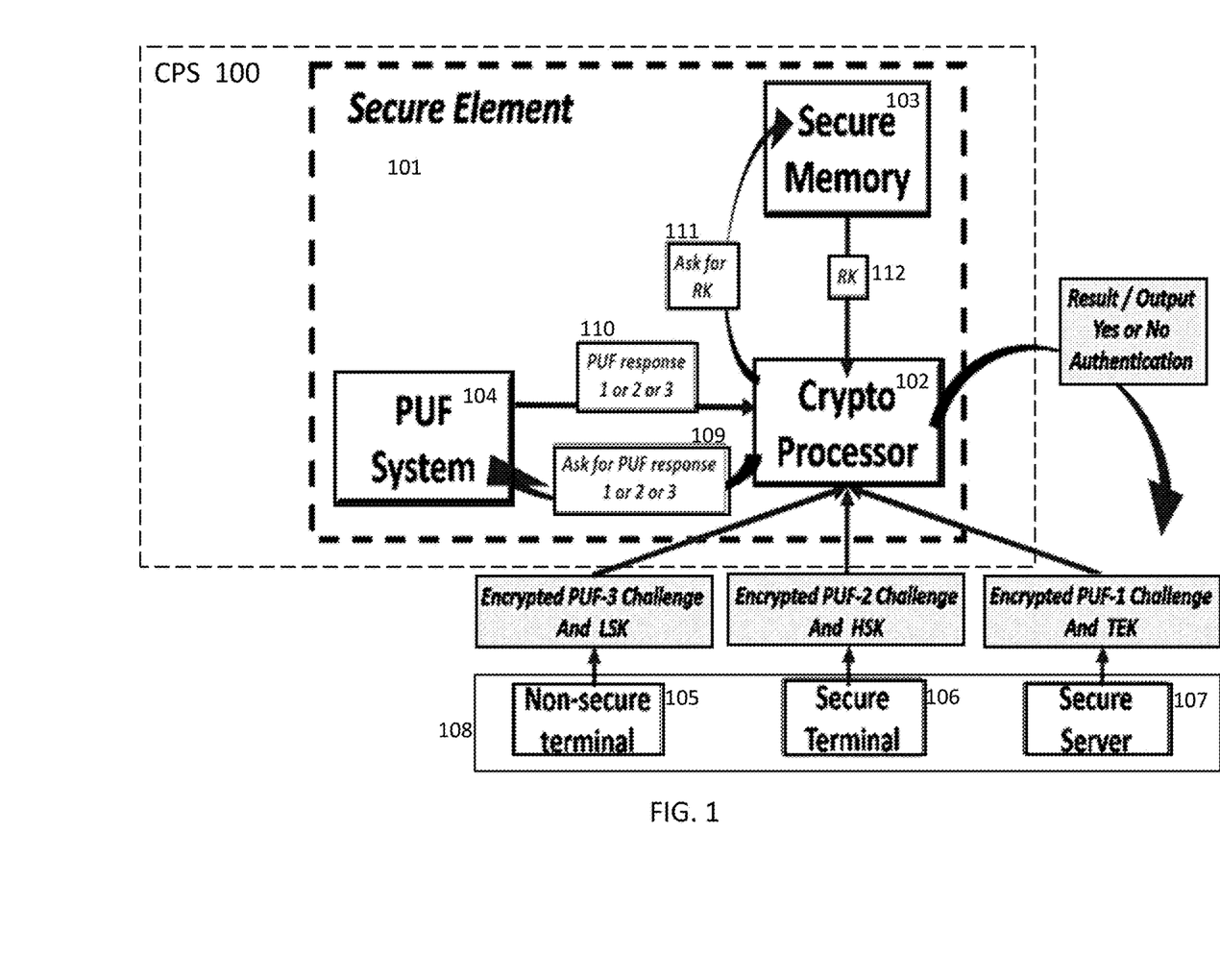
FIG. 1 is a block diagram of an example authentication system.

Generally, the present disclosure integrates embodiments of a PUF system into embodiments of a hardware-implemented cyber security apparatus and method for securing a CPS and other networks of connected devices. FIG. 1 depicts a block diagram of an example embodiment of a hierarchical security system that incorporates PUFs, and how the systems may be implemented across a number of distributed devices in a CPS 100 or across one or more communication networks. A secure element 101 may implemented on one or more physical computing devices to control access to the CPS 100 by one or more requesting devices (e.g., access terminals 105, 106, 107) over a communication network 108. The secure element 101 includes a crypto-processor 102, a secure memory array 103, and a PUF generator system 104. These elements may communicate with one another to exchange information for authenticating users of a computer, CPS, or other system. The access terminals 105-107 have varying levels of cybersecurity protocols due to the different levels of potential risk of cyberattack inherent in their use, connectivity, or other factors. For example, non-secure terminal 105 may be a device or access point that connects to secure element 101 in a manner that has a relatively high susceptibility to cyberattack. Secure terminal 106 may be a device or access point that connects to secure element 101 in a manner that is relatively secure; i.e.: it is less vulnerable to attack than a non-secure terminal 105, but is not a completely protected environment. Secure server 107 is a device or access point that connects to secure element 101 in the safest manner relative to all access terminals 105-107. Access control is granted to a terminal 105-107 after a multi-factor authentication process, wherein the level of security required for authentication may be altered depending on the risk level of the access point.

When access to a secure element 101 from one of the terminals 105-107 is desired, the corresponding terminal 105-107 submits a PUF challenge and cryptographic key to the crypto-processor 102. As illustrated each of these PUF challenges and cryptographic keys may be different, depending on the physical composition and/or the cybersecurity level of the requesting terminal 105-107: the non-secure terminal 105 encrypts a PUF-3 challenge and low-security key (LSK); the secure terminal 106 encrypts a PUF-2 challenge and high-security key (HSK); and, the secure server 107 encrypts a PUF-1 challenge and a trusted environment key (TEK). The crypto-processor submits a response request 109 containing the received PUF challenge to PUF system 104, and receives a response 110, creating a Challenge Response Pair (CRP). Each CRP is unique for each hardware device, and therefore may be used to determine the identity of the device and the associated security risks of that device. Crypto-processor 102 also communicates a request 111 for a reference key 112 associated with the CRP (and thus, with the connecting device) from secure memory 103, and receives the reference key 112 in response.

The crypto-processor 102 compares the reference key 112 provided by secure memory 103 to the cryptographic key provided by the requesting device (e.g., access terminal 105-107), as well as performing other security checks on the cryptographic keys such as verifying the number of binary or "don't care" states in the cryptographic key to prevent spoofing attacks or using encryption/decryption protocols to protect the communication channels between the crypto processor 102 and requesting device from eavesdropping. If the requesting device passes the security protocols, the crypto processor 102 may provide positive authentication and grant access. These methods may be implemented in a way that creates hierarchical levels of security. For example, when a secure server 107 is requesting access to the CPS 100, the PUF challenge would identify it as a trusted device and would trigger a fast access to final authentication, whereas a PUF challenge from a non-secure terminal 105 would be subjected to higher levels of screening when comparing the cryptographic key to the reference key.

In the block diagram of FIG. 1, the PUF system 104 and secure memory 103 may be implemented on a number of commercially available memory arrays. Memory arrays of all sorts have been reported as excellent devices to generate PUFs using intrinsic randomness imparted during the manufacturing process. Usually PUFs need only 128 to 256 bits, where each CRP is a string of 128 to 256 characters in length, though some commercial memory arrays integrated within secure micro-controllers could have large densities in the mega-byte range. Many types of memory utilize binary data states, wherein each bit of a string takes a value of "0" or "1." Ternary Content Addressable Memory (TCAM) allows a third state of "X" or "don't care" for one or more bits of the string. This adds flexibility and can increase the speed of operations when comparing two strings of bits to identify where matches occur. To illustrate how this may occur an example stream of 16 bits, consisting of 0's, 1's, and X's may be paired with a reference pattern stored in a TCAM memory array.

A TCAM array could have a large quantity of 16 bit reference patterns stored in memory. To find a match between an in input string of bits and a string stored in a memory array, Exclusive OR (XOR) logic may be applied to compare each bit of the input string with stored address patterns using the truth table of Table 1. If a mismatch occurs between the pattern stored in the TCAM and the pattern of the input string, the result will be a "1" in the truth table. On the contrary, if the pattern stored in the TCAM and the input string are identical, the result will be a "0", i.e. a "match". Any bit that contains an "X", or "don't care" state would also result in a "0" or "match." The patterns stored in the TCAM will be considered a match with the input string if, and only if, the result of the XOR between each bit of the reference patterns stored in the TCAM and the input string is a stream of 16 "0"s.

TABLE 1

Truth Table of XOR Logic

| | OUT | | |
|---|---|---|---|
| IN | 0 | 1 | X |
| 0 | 0 | 1 | 0 |
| 1 | 1 | 0 | 0 |
| X | 0 | 0 | 0 |

For example, the following input string (eq. 1) would be considered a match to the following patterns (eq.2 and eq. 3) stored in the TCAM, because each bit in the input string matches with an equivalent bit in the same position in a TCAM stored string (i.e. 1's match 1's or X's, 0's match 0's or X's) and therefore the results of the XOR would be 16 0's.

$$(001x\ xx01\ 100x\ x110) \tag{eq.1}$$

$$(0011\ 1101\ 1001\ 1110) \tag{eq.2}$$

$$(xxxx\ xx01\ 100x\ xxxx) \tag{eq.3}$$

The use of ternary states for matching two strings of bits has been proposed as a method for authentication between two devices or a user and a device. The TCAM architectures can be implemented in any memory, which makes it possible to implement them with PUFs in a hierarchical security system.

Figure 2:
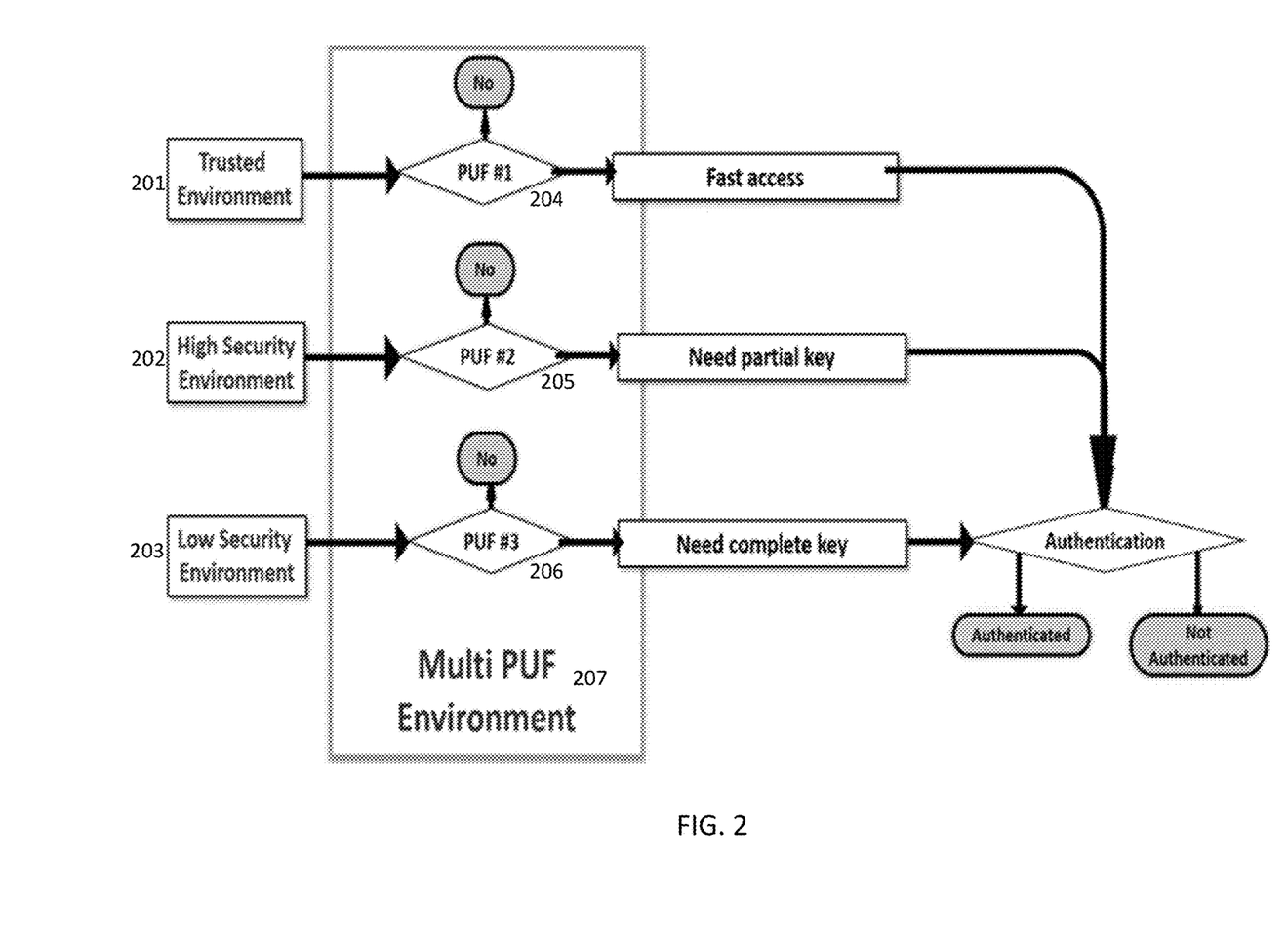
FIG. 2 is a block diagram illustrating three levels of authentication that may be used with multiple physically unclonable functions ("multi-PUF").

FIG. 2 is an example of how PUFs and cryptographic keys with ternary states may be implemented in tandem, such as described and illustrated in FIG. 1. FIG. 2 is a schematic describing an example embodiment of a use of PUFs for an authentication process with three levels of security. Though this example includes three levels of security, in other embodiments there may be more or fewer. The security levels may be adjusted depending on the threat levels of the physical or cyber environment, and the type of PUF needed for authentication access may change accordingly. In trusted environment 201 the threat level is much lower. When PUF 204 is provided in the multi-PUF environment 207, it provides preliminary authentication and triggers fast access to final authentication. In a low security environment 203, providing PUF 206 as a way of preliminary authentication triggers higher levels of screening requiring the complete authentication key. In this example, a high security environment 202 is providing PUF 205, and a partial authentication key is required for access.

The trusted 201, high security 202, and low security 203 environments could be chosen by a network administrator or someone involved in maintenance of a CRP. For example, a highly trusted environment 201 may be an IT manager, while two levels of security 202, 203 can be given to users as a function of where they are physically located, such as a public workspace. The two levels of security may also be a function of how users interact with the system, such as through the internet or other wireless communication protocols, or any other method for assessing cybersecurity threats. In this authentication method utilizing multiple PUFs, the backdoor offered to the highest level of trusted access is still safely protected by the PUF 204, while the environments with the lower levels of security 202, 203 are protected by more complete sets of cryptographic primitives 205, 206. The PUF's challenges are directly generated by the hardware during initial set up, keeping the entire system friendly to use at all levels of security.

Figure 3:
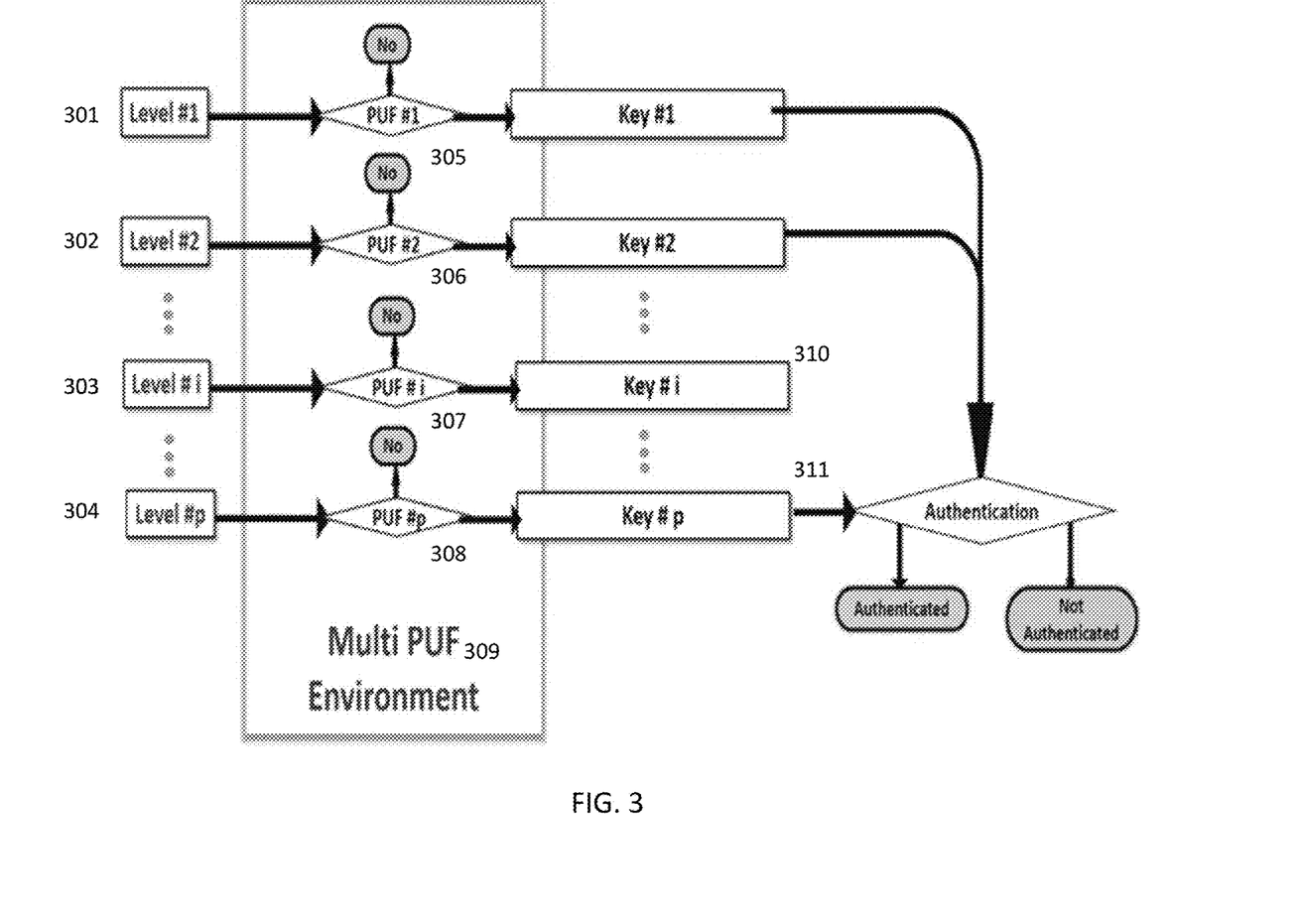
FIG. 3 is a block diagram illustrating an example of scaling the multi-PUF authentication system of FIG. 2.

The methods illustrated in FIG. 2 may be expanded to a larger number of security environment levels, an example embodiment of which is depicted in FIG. 3, by generalizing the scheme of multiple PUFs with multiple levels of security. As illustrated here, there may be a multi-PUF environment 309 where additional levels 303,304 of security may be added to the hierarchy. Each new level 303, 304 may then be authenticated by PUFs 307, 308 and authentication keys 310, 311 of appropriate level. In addition to the creation of additional hierarchical levels of security, a security manager of a system may change the level of security required for a given environment, such as when a threat is detected. In that case, security protocols may become stricter before authentication.

Figure 4:
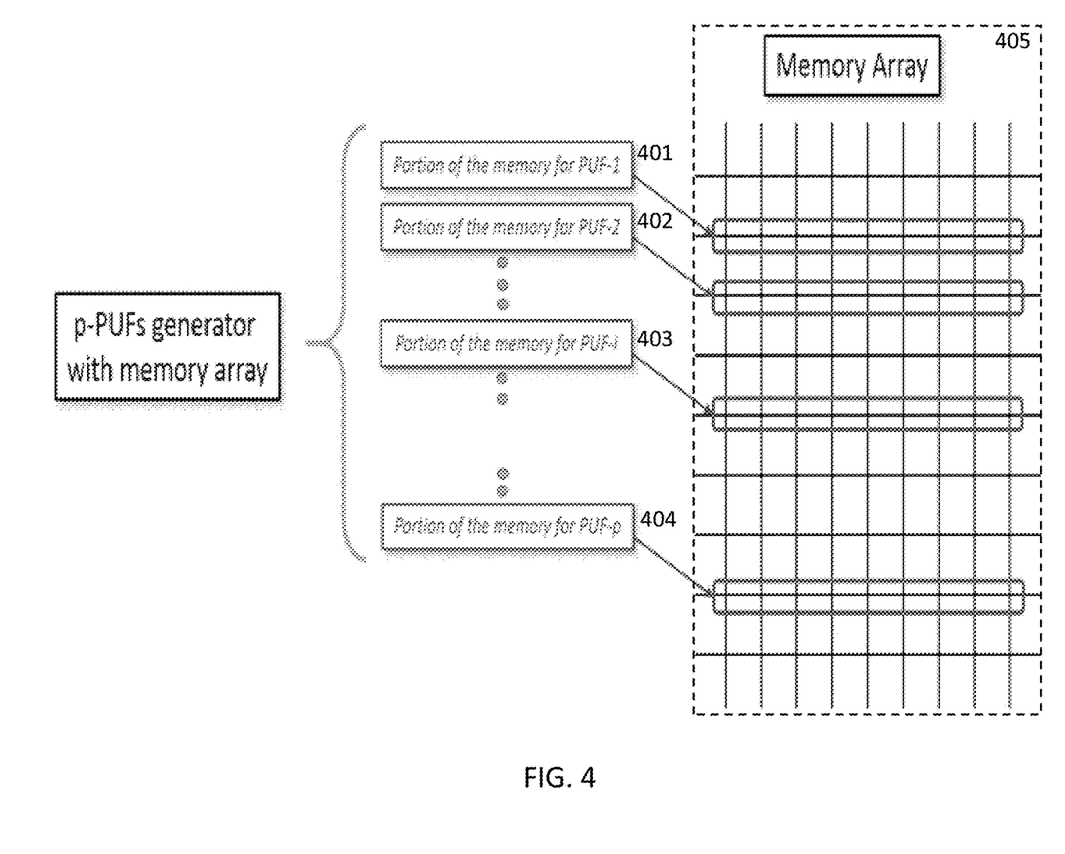
FIG. 4 is a block diagram illustrating an example of a multi-PUF generation with a memory array.

Multiple PUFs may be generated from a single physical device. The computational overhead to extract multiple PUFs from a component, such as a memory array, is quite light. FIG. 4 illustrates an example method of generating multiple PUFs 401, 402, 403, 404, from a single memory array 405. Each portion of memory used to generate PUFs 401, 402, 403, 404, may be used for different levels of security, such that 401, 402, 403, and 404 are PUFs of increasing levels for security, for example. A typical PUF challenge and response are streams of 128 to 256 bits, while typically the memory space embedded in a secure microcontroller is in the megabit level or higher. In one embodiment, a system may need 100 different levels of security for a variety of safety environments. If each PUF CRP stream consists of 256 bits, only 25,600 cells in the memory array would need to be set aside for generating multiple PUFs. In a typical memory array this would represent only a small fraction of the available memory space. A PUF management system used to generate multiple PUF challenges, responses, and to measure the CRP error rate is external to a memory array, and does not require many more silicon gates than a PUF management system with a single PUF challenge.

It is notable that memory arrays are not the only physical elements suitable for multi-PUF generation. In this example embodiment, memory arrays were used exemplify the apparatus and methods for physical hardware-based hierarchical levels of security. Other embodiments may include, but are not limited to, ring oscillators, logic based on gate delays, and latches. Different methods or combinations thereof may be used in other configurations or embodiments for the generation of multiple PUFs.

Figure 5:
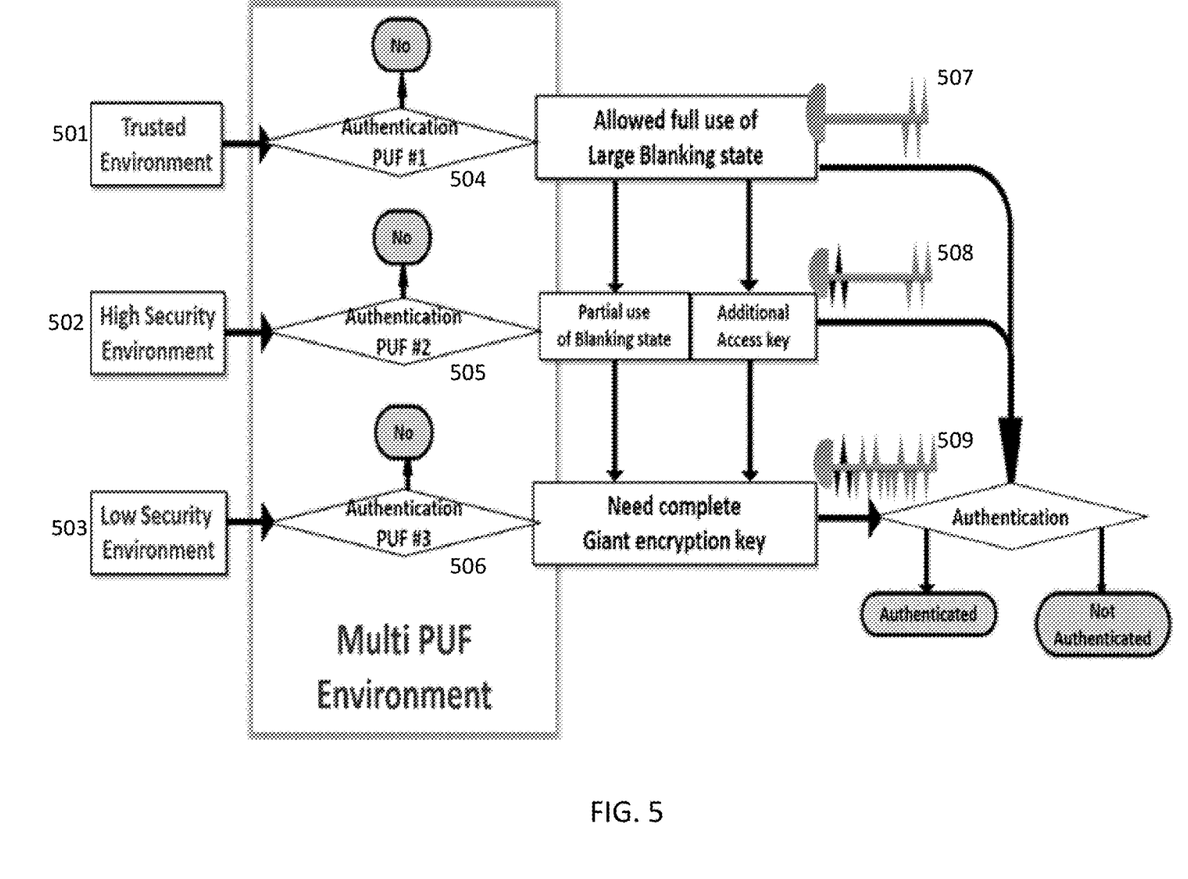
FIG. 5 is a block diagram illustrating an example of hierarchical authentication with "don't care" states.

In another embodiment, a multi-PUF system and methods are supplemented with a set of cryptographic keys that includes a ternary "don't care" state. The concept of a set of cryptographic keys creating a hierarchical level of access control is presented in FIG. 5. A case of three environments with different threat levels 501, 502, 503 is presented. The cryptographic key 507 for the trusted environment 501 has only a few teeth. The key 507 is representative of a stream of data bits, where each "tooth" represents a data state of 1 or 0. The lack of teeth along the body represents "don't care" data states, and the large number of "don't care" states are indicative of security protocols with lower scrutiny. Such a key may only be valid for authentication in presence of a PUF 504 as provided by a device in a trusted environment 501. Such a PUF 504 and cryptographic key 507 combination may be used by highly trusted users such as an IT manager, for example. The cryptographic key 509 for a device in a low level security environment 503 is the most complete, with a set of teeth defining the entire key and without "don't care" states. A device at this lowest level of security would be identified by PUF 506, and alert the system that a complete cryptographic key is needed for authentication. A device in high level of security environment 502 is identified by PUF 505 and must submit cryptographic key 508 with a medium level of complexity. Cryptographic key 508 includes more teeth than the key 507, but also some "don't care" states. It should be clear in this embodiment that increasing the number of teeth on a cryptographic key is representative of increasing security complexity and the hierarchical nature of the cybersecurity system. FIG. 5 is a simplified representation of the cryptographic keys with ternary logic with "don't care" states as described previously in this disclosure using TCAM.

Figure 6:
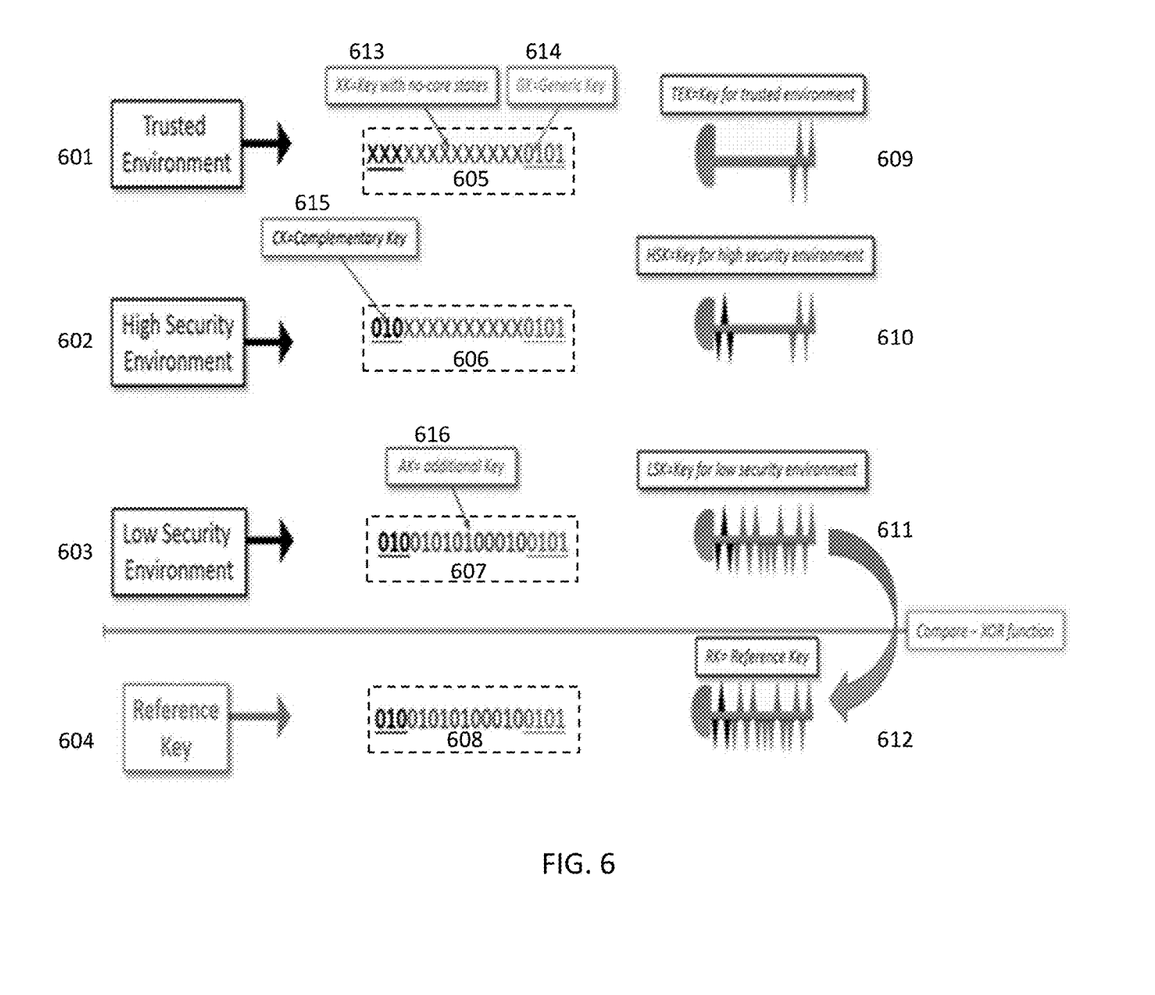
FIG. 6 is a block diagram illustrating an example of key generation with "don't care" states.

FIG. 6 gives a detailed explanation of the cryptographic keys with ternary "don't care" states and how they may be generated and utilized in the system of the current disclosure. In the embodiment depicted in FIG. 6, the cryptographic keys 605, 606, 607, 608 are 16 digit strings comprised of ternary states 0, 1, and X, where an X represents a "don't care" state. Illustrations 609, 610, 611, 612 are provided as a graphical representation of the 16 digit strings stylized as a key, with a tooth representing each 1 or 0 data state, depending on orientation, positioned along the shaft in the relative position of the each number in the 16 bit data string. There are no teeth depicted along the shaft of a key in positions of the data string that contain "don't care" data states. In an example embodiment, the key 609 for a device in a trusted environment 601 may be data string 605 (xxxxxxxxxxxx010) composed of a number of "don't care" states 613 as well as a generic key 614 portion comprising the last four digits of the string. For a device in a high security environment 602 an example key 610 may be data string 606 (010xxxxxxxxx0101) composed of a number of "don't care" states 613, generic key 614, as well as a complimentary key 615 portion. The generic key 614 is in the same position on key 610 as in key 609 such that those portions of the keys, and the corresponding data states in those positions in strings 605, 606, are a perfect match. For a device in a low security environment 603 and example key 611 may be data string 607 (0100101000100101). This string is composed of generic key 614, complementary key 615, and an additional key 616; no portion of this key contains "don't care" states. The reference key 612 is a 16 digit string 608 of reference values. It serves as a control against which other cryptographic keys 605, 606, 607 are compared, using the XOR logic framework described earlier in this disclosure, for authentication purposes. If the pattern of data states on the cryptographic key(s) match the pattern of data states on the reference key 612, the authentication will be confirmed.

Figure 7:
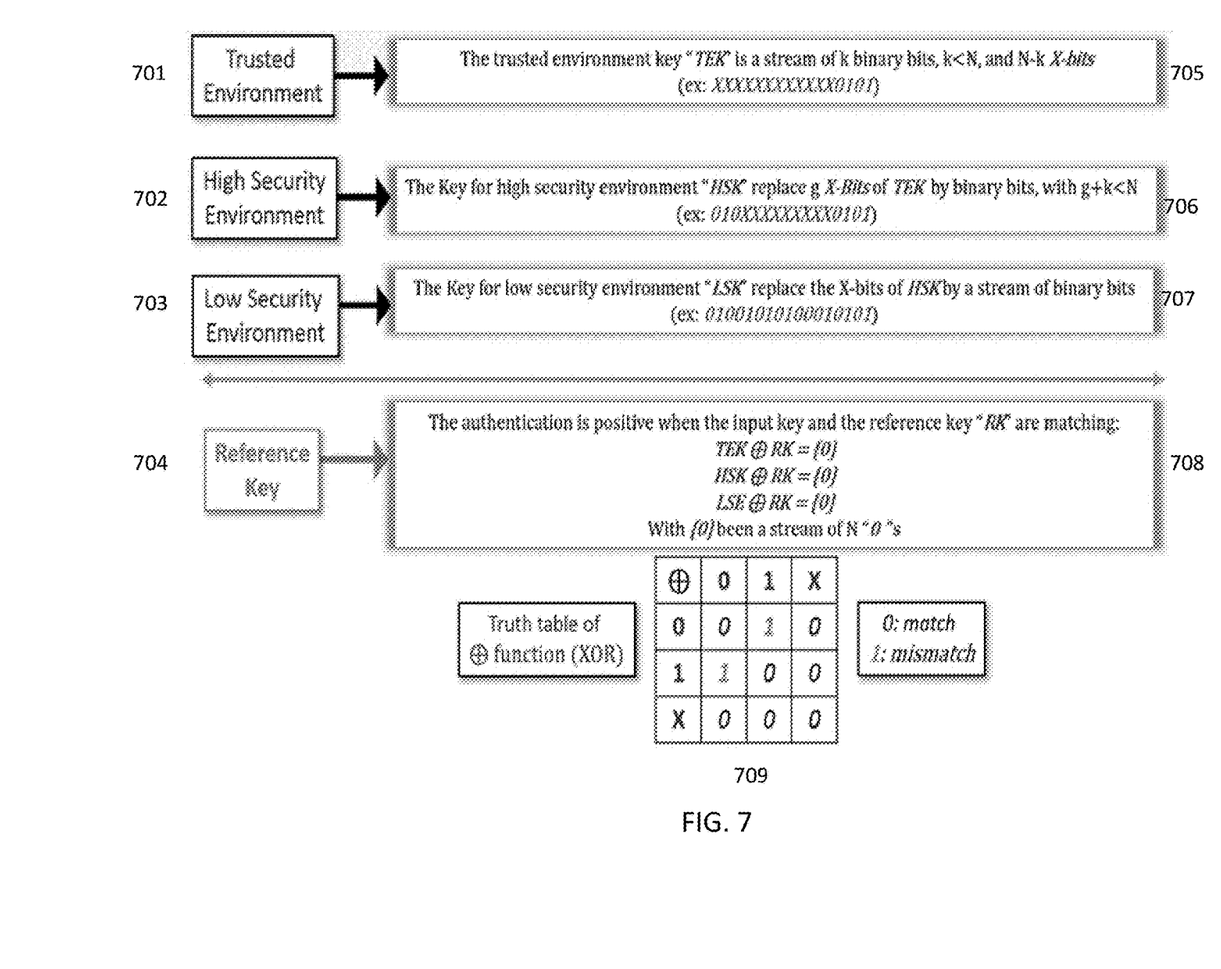
FIG. 7 is a block diagram illustrating an example key generation and mathematical representation.

Described here is a single example embodiment using cryptographic keys with 16 digit strings of data states. These keys may be generalized to include different number of bits, different size generic, complementary, or additional key portions, and different distribution of "don't care" states as depicted in FIG. 7. For example of how this architecture may be scaled, a key may have 'N' bits in a data string representing the ternary states 0, 1, or X. For an example key to be used in a trusted environment 701, there may be 'k' binary bits corresponding to 0 or 1 data states, where 'k' may be any number less than 'N.' These 'k' bits were referred to as the generic key 615 in FIG. 6. In key 705 there may then be an N-k number of "don't care" states in the remaining bits. A key associated with a high security environment, 706, may be based on the key 705 used in trusted environments, wherein the key 706 is identical to key 705 except a certain number 'g' of the "don't care" bits of key 705 are replaced by binary bits 0 or 1. A key 707 associated with the environment with lowest level of security 703, is based on the key 706, wherein the key 707 is identical to key 706, except a certain number 'h' of the "don't care" bits are replaced by binary bits 0 or 1. This process of iteratively replacing "don't care" bits with binary bits of value 0 or 1 may be repeated until there is a key with only binary bits 0 or 1. Each successive iteration of replacing the "don't care" bits with binary bits creates an additional hierarchical level security, wherein a key comprised entirely of 0s and 1s would be the most secure. FIG. 7 illustrates a mathematical representation of the authentication process using the cryptographic keys of the example embodiment of depicted in FIG. 6.

After being generated, cryptographic keys are used to authenticate users or device and permit access control to a system. A string of bits comprising the cryptographic key for each security level is compared to a reference key for authentication. Each bit from a cryptographic key is compared to each bit of a reference key using Exclusive OR (XOR) logic. If two bits match, an output 0 is stored in a truth table whereas if the two bits do not match, an output of 1 is stored in a truth table. Bits with an X, or "don't care" state match either the 0 or 1 bits, and a 0 is stored in a truth table. An example truth table 709 comparing two short strings is depicted in FIG. 6. A first string along the top row 0 1 X is compared with a second string 0 1 X along the leftmost column. The cells formed from intersecting rows and columns contain either a 0 or 1 that indicate whether the bits match or one of the bits was a "don't care" state. Authentication is granted when the diagonal row running from top left to bottom right consists entirely of 0's, expressed mathematically as:

$$\text{Cryptographic Key} \oplus \text{Reference Key} = [0], \text{ a stream with } N \text{ "0"s} \quad \text{(eq. 4)}$$

The iterative process of creating cryptographic keys with "don't care" and binary data states ensures that all cryptographic keys are a subset of a single reference key, and may all be authenticated by a single reference key. Additional measures may be used to ensure that a spoofing attack is not successful. An example of this type of attack may occur if a hacker presents a key with a large number of "don't care" states. By definition, bits with "don't care" data states will always match with a reference key, so there may need to be additional precautions to prevent a single string of "don't care" states to bypass authentication. One method employed is to count the number of "don't care" data states for a given security environment and tie it to the PUF used for the authentication. For example, a PUF may trigger an authentication that is only positive if the total number of "don't care" states is equal to some predetermined value. So a positive authentication at a certain level of security may only be granted if the provided cryptographic key matches the reference key, and contains the precise number of "don't care" states as determined in the PUF device identification process.

There are additional advantages to implementing ternary data states in the cryptographic keys. This architecture may be customized to fit several requirements in security and privacy within a system. For example, at a certain security level, a subset of cryptographic keys at that level may be a stream of binary bits only known by a particular user, while other users at that security level may have cryptographic keys with "don't care" states in the corresponding locations. In such a setup, only the particular user may know the complete combination, providing backdoor access or additional privacy controls. Such a system may be beneficial for example when providing access to regular users and guests connecting from devices in environments at the same level of security.

The authentication methods described above can be deployed in several ways or combinations to meet an end system's desired security levels. Referring back to FIG. 1, the block diagram illustrates an example of a hierarchical system having three levels of security 105-107 with connected to a CPS 100 through a secure element 101 that is comprised of a crypto-processor 102, a secure memory array 103, and a PUF generator system 104. For multi-factor authentication both the PUF challenge and corresponding key have to be provided by a user. The crypto-processor 102 manages the authentication while retrieving the corresponding response from the PUF generator system 104, and the reference key from the secure memory 103. The crypto-processor may perform additional checks as well, such as counting the number of "don't care" bits in a cryptographic key, comparing the input cryptographic key with a reference key, as well as using encryption/decryption protocols to secure communication channels between the crypto processor and access terminals 105-107. Encrypted communication may be necessary, for example, to allow a user to send encrypted PUF challenges from an access terminal to prevent a third party from getting that information.

Figure 8:
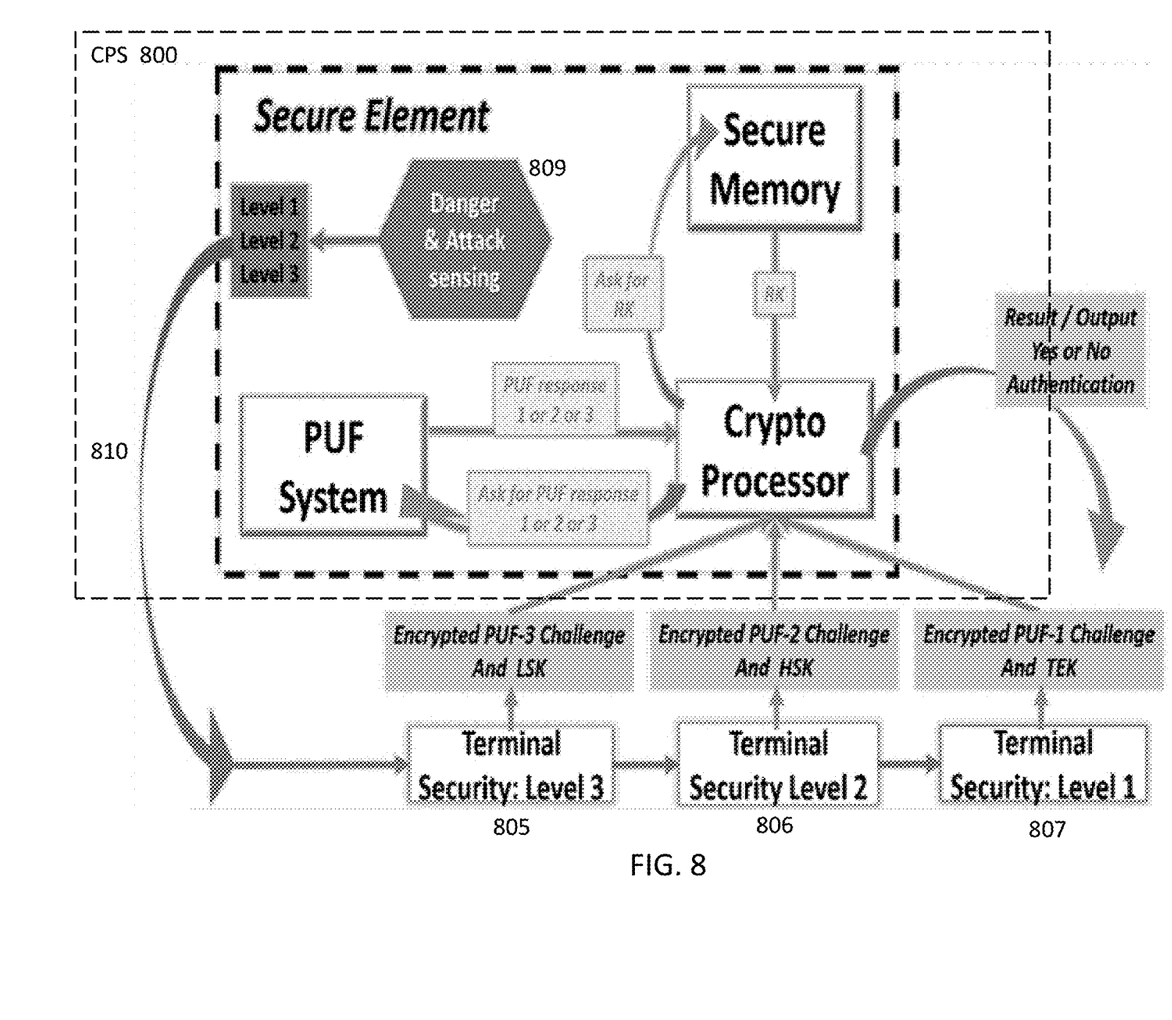
FIG. 8 is a block diagram of an authentication system with scalable security.

Several tools and methods are now commercially available that may be able to sense a threat or suspicious activity in a network. As shown FIG. 8 these tools 809 can be combined with other system architecture to incorporate the sensing of danger and threats. A feedback loop 810 can dynamically alter how access is controlled and what are required for authentication. For example, access along one of the particular security paths that may have been compromised could be blocked in favor of the other paths. For example, access by devices at security level 3 805 may be blocked, while keeping the path through higher levels 806, 807 of security available. Like all embodiments described herein, this is for illustrative purposes; nearly all aspects of this may be configured, combined, or otherwise altered or modified to fit the security scheme.

Figure 9:
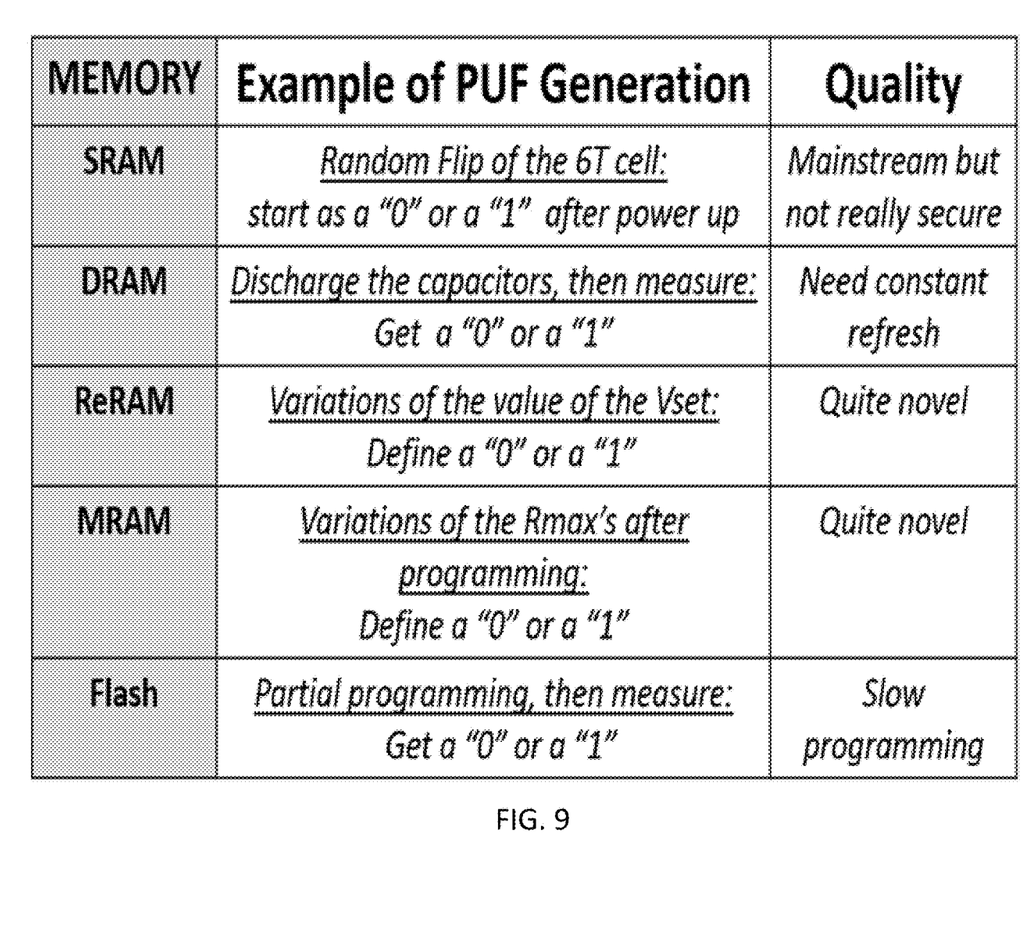
FIG. 9 is a table of example methods to generate PUFs from different types of memory arrays.

Physically unclonable functions are embodied in the physical structure of the hardware system upon which they are based; the unique identity and strong cryptographic qualities are inherent byproducts of the physical microstructure of a component. The challenge-response authentication structure of a PUF does not reveal this underlying microstructure, making them highly resistant to spoofing attacks. It also requires only a small hardware investment, as the physical hardware size need only be proportional to a particular proportion of the number of challenge-response bits. Alternatively, PUFs can be built or implemented using existing hardware components. Some examples are listed in FIG. 9, and include such memory arrays as SRAM, DRAM, Flash memory, and others. It is notable that memory arrays are not the only physical elements suitable for multi-PUF generation. Other methods to generate PUFs may include, but are not limited to, ring oscillators, logic based on gate delays, and latches. Different methods or combinations thereof may be used in other configurations or embodiments for the generation of multiple PUFs.

There are a number of examples of adjustments that may be implemented in order to create modular and hierarchical security for a CPS or other group of devices. In one embodiment, there may be multiple PUFs for each device and additional cryptographic keys are not necessary at some or all security levels. Such a system can benefit from the multi-PUF generator, and the distribution of multiple challenges for each device. In this embodiment the system may still be secure if a PUF challenge is compromised. It may also be possible to switch among PUF challenges to prevent a potential hacker from successfully spoofing a PUF challenge.

In another embodiment it may be possible to implement only cryptographic keys with "don't care" states with limited or omitted use of a multi-PUF system. Such an architecture still provides a hierarchical security levels without requiring each piece of hardware to be initialized with PUF CRPs. This method may be made more secure by using longer strings of binary bits for reference and cryptographic keys used for authentication.

In another embodiment, multiple PUFs for each device may be implemented with multiple keys without "don't care" states. This would offer strong protection across all levels, but would require greater computational effort and space to store all binary digits for all reference and cryptographic keys.

In another embodiment, a multiple PUF generator system may be used to create multiple PUF challenges paired with multiple responses that can offer separate authentications for separate classes of users. Each user would be given a particular PUF challenge that needs to be matched with the corresponding PUF response during an authentication cycle. Alternatively, in other embodiments it may use a different set of cryptographic keys for each class of users.

In some embodiments, the set of hierarchical keys may be based on a single reference key stored in the secure element such as memory. All cryptographic keys match the single stored key with an exclusive XOR ternary logic. The users given a key with the highest number of "don't care" in their cryptographic key need to operate in the highest security environment, while the users given a key with the lowest number of "don't care" in their cryptographic key may operate in the lowest security environment.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. An authentication system for controlling access to a cyber-physical system, the authentication system comprising:
    secure memory storing a reference key and a challenge-response pair (CRP) generated from a hardware device authorized to access the cyber-physical system, the secure memory configured to receive a request for the reference key, compare information in the request to the CRP, and send the reference key when the information matches the CRP;
    a physically unclonable function (PUF) system that generates responses to PUF challenges; and
    a processor in communication with the secure memory, the PUF system, and a communication network, the processor executing program instructions that, upon execution, cause the processor to:
        receive, from the hardware device over the communication network, a request for access to the cyber physical system, the request comprising a PUF challenge and an authentication key;
        determine, based on the PUF challenge, whether the hardware device corresponds to a first security level or a second security level;
        send the PUF challenge to the PUF system;
        receive, from the PUF system, a PUF response;
        associate the PUF challenge with the PUF response to produce a first CRP;
        send the first CRP to the secure memory;
        receive the reference key from the secure memory;
        compare the authentication key to the reference key to determine that the hardware device is authorized to access the cyber-physical system, wherein:
            responsive to a determination that the hardware device corresponds to the first security level, the processor compares all of the authentication key to the reference key; and
            responsive to a determination that the hardware device corresponds to the second security level, the processor compares only a first portion of the authentication key to the reference key; and
        allow the hardware device to access the cyber-physical system.

2. The authentication system of claim 1, wherein the PUF challenge and the authentication key are encrypted, execution of the program instructions further causing the processor to decrypt the PUF challenge and the authentication key.

3. The authentication system of claim 1, wherein the PUF system is implemented in one of a memory array, a ring oscillator, and a gate delay structure.

4. The authentication system of claim 1, wherein:
    the authentication key consists of a generic key, a complementary key, and an additional key;

execution of the program instructions further causes the
processor to determine whether the hardware device
corresponds to a third security level;
the first portion of the authentication key includes the
generic key and the complementary key and excludes
the additional key; and
responsive to a determination that the hardware device
corresponds to the third security level, the processor
compares only the generic key of the authentication key
to the reference key.

5. The authentication system of claim 4, wherein the first security level is associated with a low security environment, the second security level is associated with a high security environment, and the third security level is associated with a trusted environment.

6. A method for authenticating a requesting device, the method comprising:
receiving, from the requesting device, a physically unclonable function (PUF) challenge and an authentication key;
determining, from a hierarchical plurality of levels of access control, and based at least in part on the PUF challenge, that the requesting device corresponds to a first security level;
matching the PUF challenge to a PUF response to produce a challenge-response pair (CRP) associated with the requesting device;
receiving a reference key associated with the CRP; and
comparing, based on the first security level, the authentication key to the reference key to authenticate the requesting device, wherein each level of the plurality of levels of access control includes information identifying one or more portions of a received authentication key to be compared to the reference key for determining authentication, the information for a level of highest access control indicating that all of the received authentication key is to be compared.

7. The method of claim 6, wherein comparing the authentication key to the reference key comprises:
determining that the first security level is for non-secure hardware devices; and
determining that the authentication key is identical to the reference key.

8. The method of claim 6, wherein comparing the authentication key to the reference key comprises:
determining that the first security level is for secure hardware devices;
determining that the authentication key and the reference key are the same length;
identifying a first portion and a second portion of the authentication key; and
determining that the first portion of the authentication key matches a corresponding portion of the reference key, without comparing the second portion of the authentication key to the reference key.

9. The method of claim 6, further comprising, before receiving the PUF challenge:
generating a plurality of PUFs, each from a different portion of a memory array; and
associating each level of the plurality of levels of access control with a corresponding PUF of the plurality of PUFs.

10. The method of claim 9, wherein matching the PUF challenge to the PUF response comprises processing the PUF challenge using the PUF associated with the first security level to produce the PUF response.

11. The method of claim 6, wherein comparing the authentication key to the reference key comprises:
identifying, in the authentication key and based on the information for the first security level, a first set of bits and a second set of bits;
setting each of the second set of bits to a "don't care" state wherein the bit matches all values of a bit in the reference key; and
determining that each bit of the authentication key matches each corresponding bit of the reference key.

12. A system, comprising a processor and memory storing program instructions that, upon execution by the processor, cause the processor to:
receive, from a requesting device, a request to access a secure computing system, the request comprising a physically unclonable function (PUF) challenge and an authentication key;
determine, from a hierarchical plurality of levels of access control, and based at least in part on the PUF challenge, that the requesting device corresponds to a first security level;
match the PUF challenge to a PUF response to produce a challenge-response pair (CRP) associated with the requesting device;
receive a reference key associated with the CRP; and
compare, based on the first security level, the authentication key to the reference key to authenticate the requesting device to the secure computing system, wherein each of the plurality of levels of access control includes information identifying one or more portions of a received authentication key to be compared to the reference key for determining authentication, wherein bits of the received authentication key that are not included in the one or more portions are replaced with "don't care" states that match the reference key.

13. The system of claim 12, wherein each level of the plurality of levels of access control is associated with a plurality of PUFs and with the same reference key.

14. The system of claim 12, wherein the plurality of levels of access control includes information for determining authentication based on a received authentication key, and to authenticate a hardware device to use the secure computing system, the hardware device presenting the received authentication key to the processor and corresponding to one of the first security level, a second security level of the plurality of levels, and a third security level of the plurality of levels, execution of the program instructions causes the processor to:
based on the information, identify in the received authentication key a first string of bits, a second string of bits, and a third string of bits that together comprise an entirety of the received authentication key; and
identify in the information comparison instructions indicating that, to authenticate the hardware device:
the entirety of the received authentication key must match a first reference key corresponding to the first security level;
only the first string of bits and the second string of bits must match corresponding first and second portions of a second reference key corresponding to the second security level, and the third string of bits is treated as matching a corresponding third portion of the second reference key; and
only the first string of bits must match a corresponding first portion of a third reference key corresponding to the third security level, and the second string of bits and the third string of bits are treated as matching corresponding second and third portions of the third reference key.

15. The system of claim 12, wherein each level of the plurality of levels of access control is associated with a different reference key.

16. The system of claim 12, further comprising a PUF system in communication with the processor and configured to receive the PUF challenge from the processor, process the PUF challenge using a PUF to produce the PUF response, and send the PUF response to the processor, wherein to match the PUF challenge to the PUF response, execution of the program instructions causes the processor to send the PUF challenge to the PUF system and receive the PUF response from the PUF system.

17. The system of claim 12, further comprising a secure memory that stores the reference key in associated with the CRP, wherein to receive the reference key, execution of the program instructions causes the processor to request the reference key from the secure memory using the CRP.

* * * * *